T. DOUGLAS.
COMBINED SPEED CONTROLLER AND BRAKE.
APPLICATION FILED APR. 24, 1913.
1,121,485.
Patented Dec. 15, 1914.
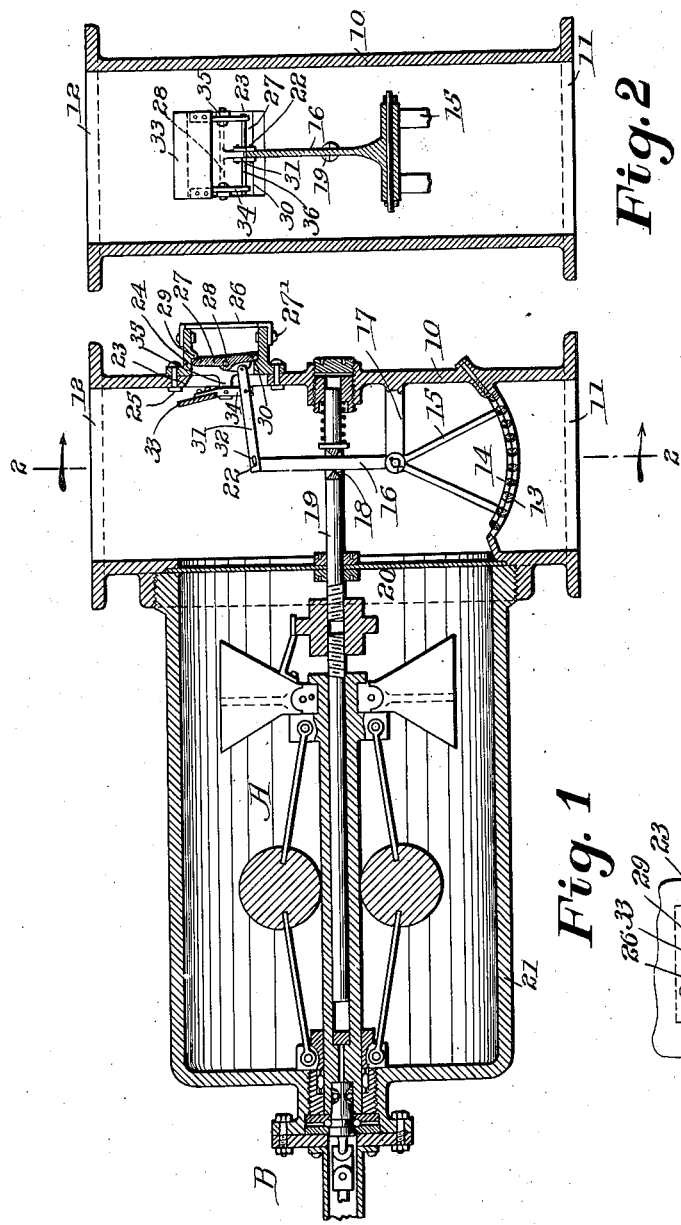
WITNESSES:
INVENTOR
Theodore Douglas
BY

UNITED STATES PATENT OFFICE.

THEODORE DOUGLAS, OF SCARSBORO, NEW YORK.

COMBINED SPEED-CONTROLLER AND BRAKE.

1,121,485.  Specification of Letters Patent.  Patented Dec. 15, 1914.

Application filed April 24, 1913. Serial No. 763,343.

*To all whom it may concern:*

Be it known that I, THEODORE DOUGLAS, a citizen of the United States, and a resident of Scarsboro, in the county of Westchester and State of New York, have invented a new and Improved Combined Speed-Controller and Brake, of which the following is a full, clear, and exact description.

This invention relates to combined speed controllers and brakes especially adapted for use in motor-driven vehicles, and has reference more particularly to the combination with a governor for regulating the flow of combustive fluid to an internal combustion motor, of means for admitting non-combustive fluid to the motor, to be compressed and exhausted through the motor, whereby the same serves to operate as a brake.

The invention also relates to the provision of a valve for admitting air to an internal combustion motor, the valve being partly controlled by the fluid supply governor, and being partly automatically operable.

Furthermore, the invention resides, independently of any governor, in providing an auxiliary air inlet supply valve for an internal combustion motor, which serves to admit non-combustive fluid to the motor while the same is in operation, in order to convert the same into a brake.

An object of the invention is to provide a simple and efficient combined speed controller and brake, which is particularly useful in connection with vehicles driven by internal combustion engines, which serves to prevent the operation of the vehicle at a speed higher than a predetermined one, and which permits the motor itself to serve as a brake when the predetermined speed is exceeded, to bring the vehicle to a rate of travel below that of the predetermined speed.

A further object of the invention is to provide a combined speed controller and brake of the class described, which is simple and compact in construction, which can be used with internal combustion engines of different types and kinds, which serves to control accurately and definitely the speed of the motor vehicle and limit it to a certain safe, predetermined rate of travel, and which provides means for quickly and certainly reducing the speed of travel of the vehicle to a normal one after the speed has been reduced, without necessitating the applying of the wheel or other ordinary brakes of the vehicle.

A still further object of the invention is to provide in a device of the character described, an auxiliary air valve which, under normal conditions is securely closed, which requires but an initial opening by the governor in order automatically to open to its full extent, which, conversely, will automatically close tightly when the necessity for operating the motor as a brake is over, and which will not in any way whatsoever affect the normal operation of the governor itself or of the motor.

Another object of the invention is to provide means for utilizing the motor of a motor-driven vehicle as a brake in case of necessity, and at the same time affording means for thoroughly scavenging the cylinders of the motor and cooling the same.

The invention consists in the construction and combination of parts to be more clearly described hereinafter and particularly set forth in the claims.

Reference is to be had to the accompanying drawings forming a part of this specification, in which similar characters of reference indicate corresponding parts in all the views, and in which—

Figure 1 is a longitudinal section of a device constituting an embodiment of my invention; Fig. 2 is a vertical section on the line 2—2 of Fig. 1; and Fig. 3 is an elevation having parts broken away, of the auxiliary air valve of the device.

Before proceeding to a more detailed explanation of my invention it should be clearly understood that the same constitutes an improvement upon those devices disclosed in my co-pending applications, Serial No. 695,296, filed May 4, 1912, and Serial No. 726,489, filed October 18, 1912. As in the speed controllers shown in the applications referred to, the present form of the device is preferably operated from a wheel of the vehicle, but it is obvious that a flexible shaft for operating the controller can be connected to and driven by a rotary element of the motor itself. Again, while my invention as shown includes a speed governor particularly adapted for use in connection with gas engines and embodying a particular form of governor and valve mechanism, it is to be understood that the invention is not limited in its application to such specific details, but is adapted for use with any type of motor or with any form of speed controller wherein the operation depends upon and is incident to an excessive rotary movement of an operative part. It should be remembered however, that with the governing device as shown in my co-pending application Serial No. 726,489 it is immaterial whether or not the combustive mixture enters the valve chamber from below the valve and passes out through the upper end. In the present form of the device however, this is not the case, for the auxiliary air valve must be located between the combustive fluid control valve and the engine. The governing device is interposed between the carbureter and the in-take manifold of the engine, and the explosive fuel in its passage from the carbureter to the engine must flow through the valve chamber of the governor, passing the auxiliary valve.

Referring more particularly to the drawings I have shown, for example, an embodiment of my invention including a valve chamber 10 through which the fluid or gas from the carbureter passes to the in-take manifold of the engine (not shown). The valve chamber has an inlet end 11 at which it is suitably connected with the carbureter (not shown), and an outlet end 12, connected with the in-take manifold of the engine. In the chamber 10 is located the valve mechanism which as shown, consists preferably of a fixed, curved grid 13 and a movable, curved grid 14, the latter being secured to the angularly disposed arms 15 of the lever 16, which is mounted to rock upon a support 17 projecting inwardly from a wall of the valve chamber. The lever engages a recess 18 of a rod 19, the recess being provided with knife edges to decrease friction. The rod 19 is connected rigidly to a flexible diaphragm 20 forming one wall of the valve chamber or passage 10. This diaphragm will permit the longitudinal movement of the rod without the provision of a stuffing box and thereby eliminate gas leakage from valve chamber 10 into the governor chamber. The latter is suitably connected with a cylindrical casing 21, in which the governor mechanism proper, A, is located. This mechanism is preferably identical with that shown in my co-pending application Serial No. 726,489, and serves, when the speed of the controller operating part to which it is connected becomes excessive, to close the valve, the rod 19 when moved in the direction of its length rocking the lever 16, to move the valve grids relative to one another. I also provide means, B, whereby a normally disconnected but automatically operated connecting coupling is introduced between the apparatus and the wheel or other movable part of the vehicle, so that the controller and its operating parts are relieved of abnormal strains due to a sudden stoppage of its propelling force or the reverse motion resulting from pre-ignition of the engine or motor. This construction too, is similar in organization and operation to that shown in my co-pending application Serial No. 726,489, and is designed for a like function, as stated.

In the present invention the lever 16 is extended a material distance through the recess 18 and above the rod 19, into the gas chamber, and there terminates in a pin 22, the ends of which project laterally at each side of the lever. The chamber wall is provided at a point opposite the diaphragm 20 and substantially at the level of the upper end of the lever 16, with an opening 23. Arranged at the outside of the casing and registering with the opening 23, is a substantially rectangular, box-like frame 24 having flanges secured by means of bolts 25 or in any other suitable manner, to the chamber wall. The frame surrounds the opening 23 and provides walls for the same at the outside of the chamber. A screen 26 of any suitable construction is attached to the outer edges of the frame, by means of bolts or rivets 27'. The screen serves for the purpose of preventing the drawing of waste or refuse into the valve chamber, through the opening 23.

A pivoted damper valve 27 is mounted within the frame and is arranged to rock about a longitudinal axis, having a transverse pivot rod 28, journaled in suitable bearing openings of the frame. The upper and lower edges of the damper valve in a normal position thereof, abut respectively against shoulders 29 and 30 provided for the purpose at the upper and lower walls of the frame, so that the valve can tightly close and prevent entrance of air into the valve chamber. I provide a pair of connecting rods 31 pivotally joined to the damper valve at a suitable lug thereof and having at the opposite ends slots 32 which receive the projecting ends of the pin 22 so that the connecting rods, or as they may be termed, rocking rods, have a limited freedom of movement relative to the lever 16.

Arranged above the rods 31 is an air vane 33 of substantially rectangular form and disposed across the upper portion of the opening 23. It is mounted upon and carried by bracket arms 34 which are pivotally supported upon inwardly extending ears 35 at the sides of the frame, so that the vane is mounted to rock toward and away from the opening 23. The bracket arms 34 have at the lower ends open slots in which are received the extremities of a cross bar 36 which extends through the connecting rods 31 and is rigidly secured thereto. In effect, the lower ends of the bracket arms are bifurcated and ride upon the cross bar.

The operation of the device is as follows, it being assumed that the governor has been set to effect the closing of the explosive fuel valve at some predetermined rate of operation: When the speed of the vehicle reaches this point the valve stem is pushed forward in the direction of its length, by the governor, and the fuel valve 13—14 is closed, preventing the further passage of the explosive fuel through the chamber. The lever 16 has then reached the extreme point of its travel toward the auxiliary air valve formed by the opening 23, the damper valve 27 and the associated parts. In order to prevent the opening of this auxiliary air valve until the fuel valve has been completely shut, I use the slots 32 to permit the limited relative freedom of movement of the lever 16 and the connecting rods 31. At this point, however, the connecting rods have been given a slight forward movement by the lever, and this movement is sufficient to open the damper valve 27 to a slight degree, that is, to "crack" it open. The valve itself is neutrally balanced on its bearings, so that when it is opened to this slight degree it will move freely. The inrushing air, due to the partial vacuum created in the chamber, after passing through the valve opening 23, strikes the vane 33 and forces it inward, rocking it about the bearings of the bracket arms 34. These then thrust forward the connecting rods a distance substantially equal to the lengths of the slots 32, the result of this movement being the further and complete opening of the valve 27. The movement of the rods 31 is of course limited by the engagement of the rear ends of the slots 32 with the pin 22.

Under normal circumstances, when the supply of motive fluid to an internal combustion engine is shut off and the engine continues to operate, the partly rarefied gases within the manifold and the cylinders are alternately compressed and expanded so that the engine, in effect, absorbs power and serves to act as a brake. The amount of power absorbed however, is comparatively small owing to the fact that the expansion of the gases gives off power just as power is required to compress it, with the incident losses due to friction, generation of heat, etc. When however, the valve 27 is opened, the engine is permitted to draw in a full charge of air through its in-take manifold and into its cylinders. This air is compressed and exhausted after its subsequent expansion, with the change however, that as a result of this further air at atmospheric pressure, greater power is required to compress the air, and thus the engine acts as an efficient brake to lower the speed of the vehicle. Of course, the same proportionate amount of power will be imparted to the engine as a result of the subsequent expansion of the compressed air, but a greater braking effect will have been developed because of the greater amount of power required to compress the air, with the resulting increased friction and compression losses. Furthermore, this introduction of air into the engine serves thoroughly to scavenge the cylinders and cool their walls and associated parts.

When the speed of the vehicle falls to a point below the predetermined rate at which the fuel valve closes, the latter begins to open and the engine again begins to draw charges through the valve. The auxiliary air valve has already been closed partly, by the resulting movement of the lever 16 and the connecting rods 31. It will now be completely closed by the action of the fuel mixture upon the vanes 33, the gas rushing through the chamber to the engine, and exerting greater pressure upon the front area of the vane than upon its smaller, back area, influenced by the air passage through the partly closed air valve. The difference in area referred to means the difference of area exposed to the gas pressure influence.

Having thus described my invention, I claim as new and desire to secure by Letters Patent:—

1. In combination, a motor, a fuel-mixture supply valve operatively connected with said motor, a governor controlling said valve, an auxiliary air valve for said motor, and means for operatively connecting said valves whereby said air valve is open when said fuel-supply valve is closed.

2. In a device of the class described, a fuel-mixture supply valve, a governor for controlling the same, an auxiliary air valve, and means whereby said governor serves to close said fuel-mixture supply and open said air valve and to open said fuel mixture supply and close said air valve.

3. In a device of the class described, a fuel-mixture supply valve, an auxiliary air valve, a governor controlling said fuel-supply valve, and an operative connection between said fuel-supply valve and said air valve whereby the one is open when the other is closed.

4. In a device of the class described, a fuel-mixture supply valve, means for automatically closing the same, an air supply valve, and means for automatically opening the same when said fuel-supply valve is closed.

5. In a device of the class described, a fuel-mixture supply valve, means for operating the same automatically, an air supply valve, means controlled by said fuel-supply valve for initially opening said air valve, and means whereby said air valve automatically opens to its full extent after it has been initially opened.

6. In a device of the class described, a fuel-supply valve, a governor for automatically controlling the same, an air supply valve, means controlled by said fuel-supply valve for initially opening said air valve, and automatically operable means directly controlling said air valve to open the same completely after it has been initially opened.

7. In a device of the class described, a fuel-supply valve, means for operating the same automatically, an air supply valve, means controlled by said fuel-supply valve for initially opening and initially closing said air valve, and means whereby said air valve automatically opens and automatically closes to its full extent after it has been initially opened or closed.

8. In a device of the class described, a fuel-supply valve for a motor, a governor operated by said motor and serving automatically to control said fuel-supply valve, an auxiliary air supply valve for the motor, means controlled by said fuel-supply valve for initially opening or closing said air valve, and automatically operable means controlled by the flow of gas or air for opening or closing said air valve completely, after it has been initially opened or closed.

9. The combination with a motor having a fuel-mixture supply chamber connected therewith, a fuel-supply valve located in said chamber, and an auxiliary air valve associated with said chamber, between said fuel-supply valve and the intake of said motor.

10. The combination with a motor having a fuel-mixture supply chamber connected therewith, a fuel-supply valve located in said chamber, an auxiliary air valve associated with said chamber, between said fuel-supply valve and the intake of said motor, and means for operatively connecting said valves whereby when one is closed the other is opened.

11. The combination with a motor having a fuel-mixture-supply chamber connected therewith, a fuel-supply valve located in said chamber, an auxiliary air valve associated with said chamber, between said fuel-supply valve and said motor, means for operatively connecting said valves whereby when one is closed the other is opened, and a governor for automatically controlling said fuel-supply valve.

12. The combination with a motor having a fuel-supply chamber, of a governor controlled by the motor, a fuel-supply valve in said chamber, an auxiliary air valve associated with said chamber, an operative connection between said valves, whereby when one is open the other is closed, and means whereby said governor controls said connection to operate said valves.

13. The combination with a motor having a fuel-supply chamber, of a governor controlled by the motor, a fuel-supply valve in said chamber, an auxiliary air valve associated with said chamber, an operative connection between said valves, whereby when one is open the other is closed, means whereby said governor controls said connection to operate said valves, and means whereby the opening or closing movement of said auxiliary valve is automatically increased.

14. The combination with a motor having a fuel-supply chamber, of a governor controlled by said motor, a fuel-supply valve in said chamber, an auxiliary air supply valve associated with said chamber, an operative connection between said valves whereby the opening or closing of said fuel-supply valve initially closes or opens said air supply valve, means whereby said governor serves to operate said fuel-supply valve, and automatic mechanism for completing the opening or closing of said auxiliary air valve after the same has been initially opened or closed.

In testimony whereof I have signed my name to this specification in the presence of two subscribing witnesses.

THEODORE DOUGLAS.

Witnesses:
J. F. COOPER,
G. H. EMSLIE.